March 15, 1955 F. H. BAILLY 2,703,977
METHOD FOR PRESERVING CORE SAMPLES
Filed Oct. 5, 1951
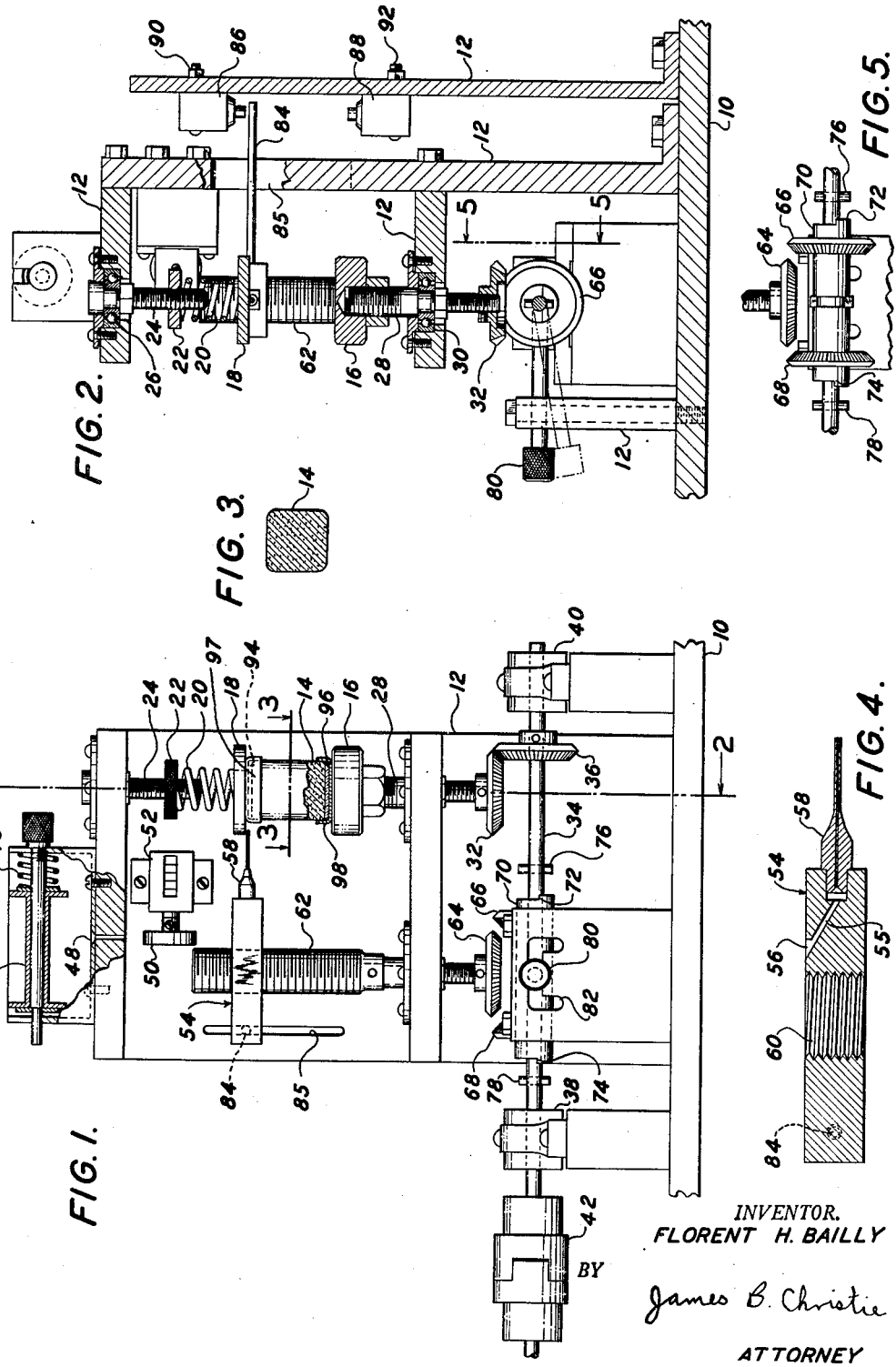
INVENTOR.
FLORENT H. BAILLY
BY James B. Christie
ATTORNEY

United States Patent Office 2,703,977
Patented Mar. 15, 1955

2,703,977

METHOD FOR PRESERVING CORE SAMPLES

Florent H. Bailly, Pasadena, Calif.

Application October 5, 1951, Serial No. 250,001

5 Claims. (Cl. 73—38)

This invention relates to methods for preserving samples of sedimentary material.

In determining the characteristics of sedimentary formations, it is common practice to obtain a sample of the formation and to make certain measurements of its physical characteristics such as its weight, porosity, etc. Such measurements are frequently made on samples from cores which are taken from holes which are drilled in search of oil and gas.

The samples are obtained by cutting a small piece of the sedimentary material from the core. Preferably, the samples are cut so that the bedding planes run lengthwise of the sample and so that the transverse cross section of the sample is substantially in the shape of a square.

It is desirable to provide some form of protection for such core samples so that they may be preserved over a period of time. Also, in order to measure the porosity of a core sample it is desirable to place a coating of a material which is impervious to liquids, around all but the two ends of the sample so as to permit accurate measurement of the porosity through the two ends.

In accordance with my invention, core samples are preserved by wrapping sufficient turns of a thread, which is impermeable to liquids, tightly around the sides of the core sample so that all the surfaces of the sample except the two ends are covered with the thread. The thread serves to retain the particles which compose the core sample in place and it also provides a protective layer around the sample so that it may be transported or stored for a long period of time without disturbing the physical characteristics of the sample.

If the core sample is unconsolidated, two rigid discs of a porous, non-absorbent material, such as porcelain, are placed at the two opposite ends of the sample. These discs are secured to the sample by means of pads of porous, non-absorbent material, such as glass wool, which are placed around the discs and around the end portions of the sample which are adjacent to the discs, and the thread is then wound around the samples and around the portions of the pads which extend along the sample so that the thread serves both to protect the core sample and to secure the pads and discs to the ends of the sample.

The weight of the sample may be determined by weighing the preserved core sample and then subtracting the weight of the thread. If porous discs and pads are employed, the weight of these items must be subtracted also.

In either case, the exposed surface of the thread is coated with an impermeable material such as pitch in order to permit accurate measurement of the porosity of the sample. The porosity is measured by forcing a liquid longitudinally through the core sample. The liquid enters and exits from the core sample through the uncoated ends of the sample. If discs and pads have been employed at the two ends of the sample, their porosity must be measured independently in order to determine the correction which must be applied to the measurements so as to provide an accurate determination of the porosity of the sample itself.

The apparatus for winding the thread is provided with a pair of rotatable discs having opposed faces between which the core sample may be secured. The thread is applied to the core sample through a guide which is automatically moved along the core sample by means of a feed, and the movement of the guide is synchronized with the rotation of the core sample. Means for measuring the length of thread which passes through the guide is provided so that the weight of the thread may be calculated.

The invention will be more fully explained with reference to the accompanying drawings, in which:

Fig. 1 is an elevation view of the apparatus for winding thread around the core sample;
Fig. 2 is a sectional view along line 2—2 of Fig. 1;
Fig. 3 is a sectional view of the core sample taken along line 3—3 of Fig. 1;
Fig. 4 is a longitudinal sectional view of the guide arrangement for the thread; and
Fig. 5 is a view along line 5—5 of Fig. 2 which shows the clutch and gearing arrangement which serves to actuate the feed for the guide.

Referring now to drawings, the thread winding apparatus is supported on a base 10 by a framework 12. The core sample 14 is secured between two rotatable discs 16 and 18.

The disc 18 is supported by means of a compression spring 20 which is attached both to the disc 18 and to a knurled nut 22, and the nut 22 is supported by a threaded shaft 24. The shaft 24 is secured to a roller bearing 26 which is supported in the frame 12. The amount of pressure which is applied to the core sample 14 is determined by the adjustment of the knurled nut 22. This pressure should be minimized so that the physical characteristics of the core sample will not be changed.

The disc 16 is secured to a shaft 28 which is rotatably supported in the frame by means of a roller bearing 30.

The disc 16 is rotated by means of a miter gear 32 which is secured to the lower end of the shaft 28. A drive shaft 34, which carries miter gear 36, is employed to drive the gear 32.

The drive shaft 34 is supported by two bearings 38 and 40, and it is provided with a flexible coupling 42 for coupling the shaft to a suitable driving means such as an electric motor (not shown).

A bobbin 44 is provided for storing the thread, and a compression spring 46 is provided for loading the bobbin. An orifice 48 in the framework is provided for guiding the thread over a wheel 50 which is connected to a counter 52. A movable guide 54 serves to control the distribution of the thread on the core sample 14. The guide 54 has an internal channel 55 which extends from one end of the guide to an orifice 56 which is aligned with the orifice 48 and the wheel 50. A hypodermic needle 58 is rigidly secured to the end of the guide 54, and the channel through the center of the hypodermic needle 58 communicates with the channel 55 within the guide, so that the thread may be pulled through the orifice 56 and the needle 58 while it is being wound around the core sample 14.

The guide 54 is arranged so that the needle 58 extends at a right angle with respect to the space between the discs 16 and 18 and hence perpendicularly to the length of the core sample 14.

The guide 54 is provided with internal threads 60 which serve as a feed nut for the guide. A shaft 62, having threads which engage the threads 60 of the guide 54, serves to support the guide 54 and also serves to control the movement of the guide 54 along the core sample 14. The shaft 62 is rotatably supported in the frame 12 by means of a bearing similar to the bearing 30 which is employed to support the shaft 28. A miter gear 64, which is connected to the lower end of the shaft 62, serves as a means for rotating the feed shaft 62.

The miter gear 64 may be driven in either direction by means of a pair of miter gears 66 and 68 which are secured to a hollow cylindrical member 70. The cylindrical member 70 is rotatably supported on the shaft 34, and it has a pair of shoulders 72 and 74 which serve to engage a pair of pins 76 and 78 in the shaft 34. The position of the cylindrical member 70 along the shaft 34 is controlled by a lever 80 which is rigidly connected to the member 70 and which is slidably supported in a U-shaped slot 82 in the framework 12.

Thus, when the lever 80 is in its neutral position as shown in Fig. 1, the feed means is not rotated. However, when the lever 80 is positioned in one of the legs of the U-shaped slot 82, the feed means is rotated in one direction, and when the lever 80 is located in the other leg of the slot 82, the feed means is rotated in the opposite direction.

A shaft 84 is rigidly secured to the guide 54, and it extends through an elongated opening 85 in the framework 12. The shaft 84 serves to prevent the guide 54 from rotating about the shaft 62, and it also serves to actuate a pair of switches 86 and 88 which are secured to the framework 12 by means of the screws and nuts 90 and 92. The switches 86 and 88 serve to interrupt the flow of power to the electric motor which rotates the shaft 34 when either switch is actuated by the shaft 84. Thus, the core winding apparatus is deactivated if the operator of the apparatus fails to reverse the direction of feed when thread has been wrapped all the way to one of the ends of the core sample.

It will be apparent that the hand operated lever 80 may be actuated by a solenoid and that the switches 86 and 88 may be employed to control the power which is applied to the solenoid so that the movement of the guide 54 is automatically reversed each time that it approaches an end of the core sample.

The core sample shown in Figs. 1 and 3 is cut from a core so that the bedding planes of the core lie in a longitudinal direction along the sample. Thus, the two ends of the core sample are disposed substantially at right angles to the bedding planes in the sample. Preferably, the core sample has a cross section which is in the shape of a square with rounded corners as shown in Fig. 3.

As shown in Fig. 1, a pair of discs 94 and 96 are located at the ends of the core sample 14. These discs are composed of a porous, rigid material which is non-absorbent to liquids, such as porcelain. A pair of flexible pads 97 and 98 are located around the outer portions of the discs 94 and 96 and around the two end portions of the core sample 14 which are adjacent to the discs. Preferably the pads 97 and 98 are composed of a material which is permeable but non-absorbent to water, such as glass wool. These pads serve as a means for securing the discs 94 and 96 to the ends of the core sample when the sample is wrapped with thread.

If the core sample 14 is well consolidated, the discs 94 and 96 and the pads 97 and 98 may be omitted, and in that case, the core sample 14 is secured directly between the rotatable discs 16 and 18.

The thread (not shown) which is wrapped around the core sample should be composed of a material which is impermeable to liquids, such as glass.

In the operation, the core sample is placed between the discs 16 and 18 as shown in Fig. 1, and the operator manually wraps a few turns of the thread around the core sample so as to secure the thread to the sample. Then power is applied to the shaft 34 so that the core sample is rotated, and the lever 80 is shifted to the proper leg of the U-shaped slot 82 so as to cause the guide 54 to move in a suitable direction. Each time that the wrappings approach the ends of the core sample 14 the operator reverses the direction of travel of the guide 54 so as to apply another layer of thread to the core sample. In case the discs 94 and 96 and the pads 97 and 98 are employed as shown in Fig. 1, the operator should wrap sufficient turns around the portions of the pads 97 and 98 which extend around the ends of the core sample so that the pads and consequently the discs are rigidly secured to the core sample.

The spacing between the turns of thread which are wrapped around the core sample is determined by the pitch of the threads on the shaft 62 and in the guide 54. These elements may be replaced easily if it is desired to change the spacing of the turns of thread which are applied to the core sample.

The number of layers of thread which are applied to the core sample depends upon how well the core sample is consolidated. If the core sample is well consolidated, a few layers of thread are sufficient; however, if the core sample is unconsolidated more layers should be applied.

After the core sample has been wrapped, the rotation of the shaft 34 is stopped, the thread is cut, and then the core sample may be removed by operating the knurled nut 22 so that the pressure which is applied by the plate 18 is substantially removed. The length of the thread which is wrapped around the core is determined from reading the counter 52, and the weight of the thread is computed from this measurement. The weight of the core sample itself is determined by weighing the wrapped core sample and then subtracting the weight of the thread and the weight of the discs and flexible pads, if discs and pads were employed.

In order to prepare the core sample for measurement of its porosity, the longitudinal surfaces of the wrapped core should be coated with an impermeable material such as pitch. This is accomplished by coating the exposed surface of the thread while leaving the ends of the preserved sample uncoated. If the flexible pads 97 and 98 and the discs 94 and 96 have been employed, the porosity measurements are made by forcing a liquid through these porous end portions of the preserved core sample along the longitudinal axis of the core sample. The porosity of these end portions should be determined independently, and then the porosity of the core sample itself may be determined by determining the porosity of the preserved core and then making a suitable correction for the porosity of the end portions. If the discs and flexible pads are not employed to cover the ends of the core sample, the porosity measurements are made by forcing a liquid directly through the core sample along its longitudinal axis. In such case, it is not necessary to make any corrections.

I claim:

1. In the treatment of a core sample, the improvement which comprises winding a filament around the sample between its ends to form a coil which is substantially fluid-impermeable and subsequently forcing a fluid into the wound sample from one end toward the other.

2. In the treatment of a core sample, the improvement which comprises winding a filament around the sample between its ends to form a coil, coating the coil thus formed with an impermeable material and subsequently forcing a fluid into the wound coated sample from end to end.

3. In the treatment of a core sample containing a bedding plane, the improvement which comprises forming two end surfaces on the sample transverse to the bedding plane, winding a filament around the sample between these end surfaces to form a coil which is substantially fluid-impermeable, and subsequently forcing a fluid into the wound core from one end surface toward the other.

4. In the treatment of a core sample, the improvement which comprises placing fluid-permeable pads on opposite ends of the sample, winding a filament around the sample between the ends to form a substantially fluid-impermeable coil and bind the pads to the sample, and subsequently forcing a fluid into the wound, padded sample through one of the pads toward the other.

5. In the treatment of a core sample, the improvement which comprises placing fluid-permeable discs on opposite ends of the sample, placing fluid-permeable pads over the respective discs and extending over the sides of the sample, winding a filament around the sample between its end to form a substantially fluid-impermeable coil and bind the discs and pads to the sample, and subsequently forcing a fluid into the wound padded sample through the pad and disc on one of the sample ends.

References Cited in the file of this patent

UNITED STATES PATENTS

| Number | Name | Date |
|---|---|---|
| 1,582,242 | Booty | Apr. 27, 1926 |
| 2,287,870 | Elvin et al. | June 30, 1942 |
| 2,288,210 | Schlumberger | June 30, 1942 |
| 2,369,155 | Marinsky et al. | Feb. 13, 1945 |
| 2,425,215 | Voelker et al. | Aug. 5, 1947 |
| 2,430,892 | Tirrell | Nov. 18, 1947 |
| 2,491,965 | Ganci | Dec. 20, 1949 |
| 2,562,199 | McLellan et al. | July 31, 1951 |
| 2,612,036 | Angona | Sept. 30, 1952 |
| 2,662,401 | Bailly | Dec. 15, 1953 |